Patented Sept. 14, 1954

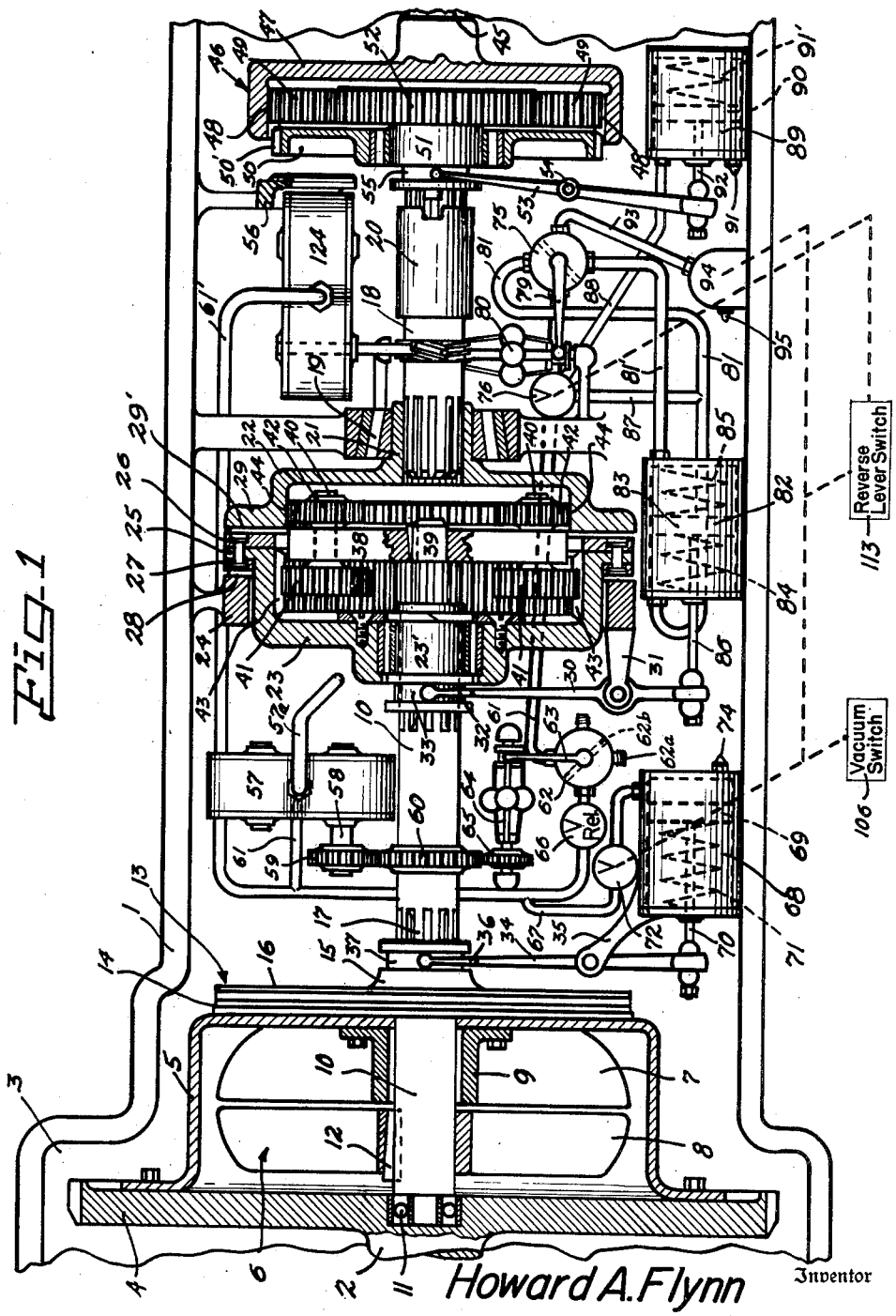

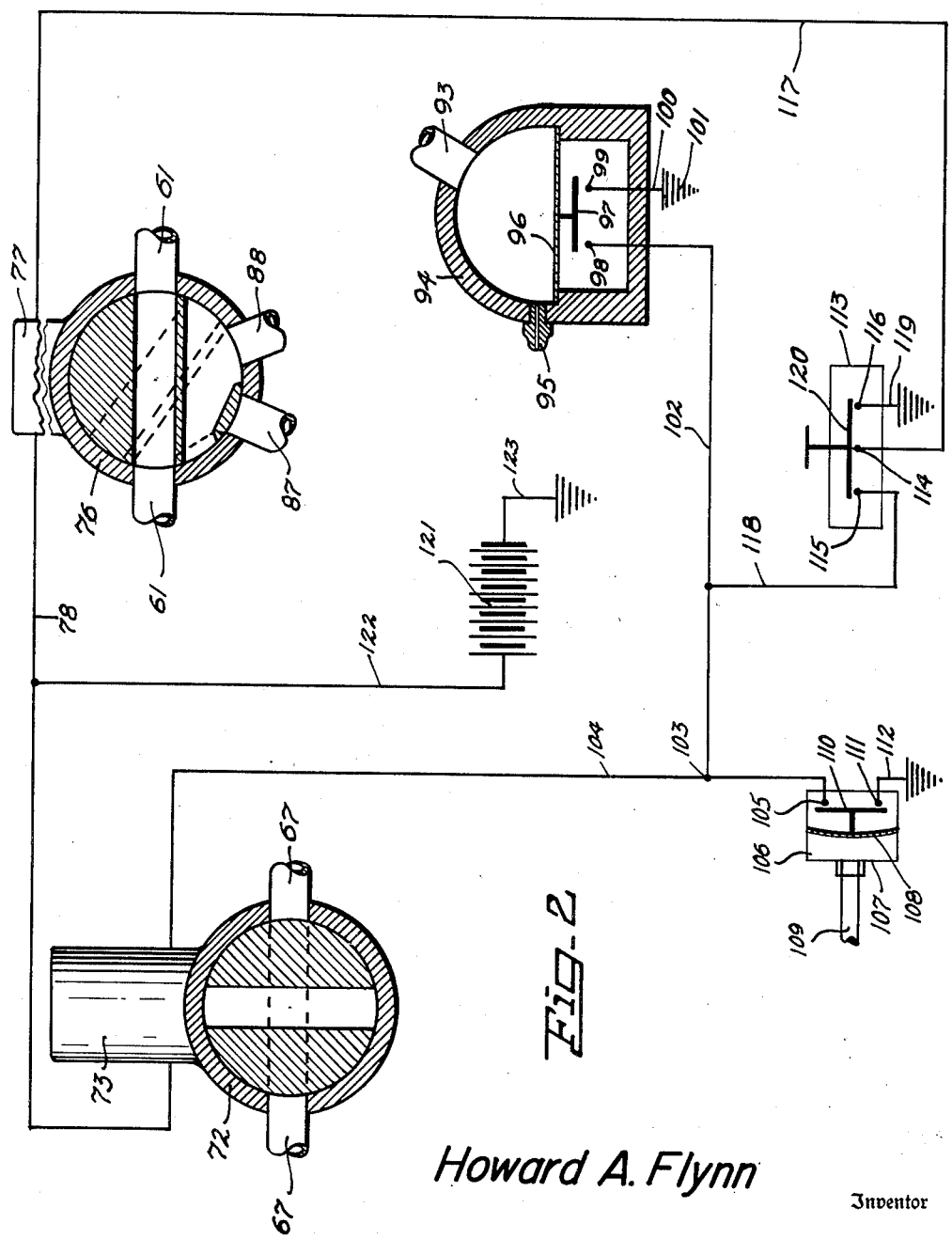

2,688,886

UNITED STATES PATENT OFFICE 2,688,886

AUTOMATICALLY CONTROLLED TRANSMISSION

Howard A. Flynn, Spokane, Wash.

Application February 2, 1951, Serial No. 209,040

4 Claims. (Cl. 74—752)

1

This invention relates to a motor vehicle transmission and constitutes an improvement over the construction disclosed in my copending application filed July 30, 1949 and having Ser. No. 107,807, now Patent No. 2,634,627.

One object of the invention is to provide a transmission with mechanism which automatically varies the gear ratio between the motor and the drive shaft of a vehicle according to the power required to propel the vehicle and the speed at which the vehicle is moving.

Another object of the invention is to provide controlling mechanism which is automatic in operation and shifts the transmission to neutral when the vehicle is nearly stopped, and moves the transmission into low as the speed of the engine increases from an idling speed, and then shifts the transmission from low to high as the speed of the vehicle is increased and the drive shaft reaches a predetermined number of revolutions per minute.

Another object of the invention is to provide mechanism which automatically effects a change from gear drive to fluid drive between the engine and the transmission while changing from idle to low, and then to high speed, and then returns to a gear drive after shifting has been performed.

Another object of the invention is to provide a transmission wherein clutches are operated by levers which are actuated by piston rods projecting from cylinders to which fluid under pressure is delivered through pipes from pumps controlled by valves which are moved to adjusted positions by governors in response to variations in the speed at which the shafts, with which the governors are associated, rotate.

Another object of the invention is to provide an improved arrangement of gears and friction clutches which are very compact and efficient in operation.

Another object of the invention is to provide a transmission which is easy to operate and very sturdy and not liable to get out of order.

The invention is illustrated in the accompanying drawings wherein:

Figure 1 is a view showing the transmission and controls partially in top plan and partially in section.

Figure 2 is a diagrammatic view showing valves in section and circuit wires and switching for controlling flow of current through the circuit.

This improved transmission has a casing 1 which is of suitable size and formation and into its front end extends the crank shaft 2 of an engine, the forward portion 3 of the casing being enlarged to accommodate the fly wheel 4. The fly wheel has secured to its rear face a housing 5 which projects rearwardly therefrom and within the housing is a fluid transmission 6 preferably of the fluid coupling type and consisting of a rotary impeller 7 and a propeller 8. The impeller 7 has a hub 9 which is secured against the rear wall of the housing and is of tubular formation and constitutes a bearing for a main shaft 10 having its front end journaled in a bearing 11 at the center of the fly wheel 4. The propeller 8 is firmly secured upon the shaft 10 by a key 12 and when the propeller is turned by action of oil in the housing, having motion impacted to it by the impeller 7, the shaft 10 will be turned. Back of the housing is a friction clutch 13 having its front disk 14 rigidly secured to the rear wall of the housing 5 and the hub 15 of its rear disk 16 splined to the shaft 10, as shown at 17, so that while the rear disk turns with the shaft it may be slid along the shaft into and out of gripping contact with the rigidly mounted front disk 14. When the rear disk is in gripping engagement with the front disk the shaft 10 is rotated at the same speed as the crank shaft 2 and when the rear disk is moved rearwardly to its inoperative position shaft 10 is free from the housing and rotary motion is hydraulically imparted to it at reduced speed by the oil in the casing 5 which has whirling motion imparted to it by the impeller 7 and acts upon the propeller 8.

An auxiliary shaft 18 is disposed rearwardly of the main shaft 10 in axial alignment therewith and rotatably mounted through bearings 19 and 20 which are of spider formation and mounted in the casing 1 in longitudinally spaced relation to each other. The front end portion of the auxiliary shaft fits into the neck 21 of the rear section 22 of a gear housing 23 which is rotatably mounted about a sleeve 23', the sleeve being splined to the shaft 10 so that the sleeve may be slid longitudinally along the shaft and the housing 23 moved towards and away from the companion housing section 22. The housing 23 is surrounded by a ring 24 rigidly mounted in casing 1, and the annular flange 25 of the housing 23 has its inner and outer side faces covered by friction rings 26 and 27, the ring or facing 27 having gripping engagement with a confronting face 28 of the ring 24 to hold the housing 23 stationary when the housing is shifted forwardly. The ring or facing 26 has gripping engagement with the face 29' of the annular flange 29 of the housing section 22 so that the two housing sections turn together when the housing 23 is shifted rearwardly. Movement of the housing 23 along the shaft 10 is accomplished by a lever 30 pivoted to a bracket 31 carried by the ring 24 and formed with a forked end 32 engaged in a groove 33 formed about the sleeve 23'. A similar lever 34 pivoted to a bracket 35 has its forked end 36 engaged in the annular groove 37 of the hub 15 for shifting the disk 16 along shaft 10 towards and away from disk 14.

Gearing is enclosed in the gear housing and includes a carrier plate or disk 38 which is keyed to the reduced rear end portion 39 of shaft 10 and is formed with openings through which pass short shafts 40 spaced from each other circumferentially of the plate. The shafts or stems 40 carry gears or pinions 41 and 42 disposed in front of and back of the plate, the pinions 41 meshing with teeth of the internal gear 43 formed internally of the annular wall of the housing 23 and the pinions 42 meshing with the teeth of internal gear 44 formed internally of the annular wall of the housing section 22. The pinions and the companion internal gears of the housing sections thus form an epicyclic train of gearing by means of which rotary motion may be transmitted from the main shaft 10 to the auxiliary shaft 18. Rotation of the carrier plate 38 with shaft 10 will cause pinions 41 and 42 to rotate within the gear housing and since the pinions 41 are larger than pinions 42 the gear housing 23 will creep or rotate and no motion will be imparted to shaft 18. This is the idling position. When the housing 23 is shifted forwardly and held stationary by brake surfaces 27 and 28 the rotation of carrier plate 38 within the housing 23 will drive the pinions and the differential between pinions 41 and 42 will cause rear section 22 to rotate at a reduced speed in a forward direction to supply a low gear ratio between shaft 10 and shaft 18. When the housing 23 is shifted into gripping engagement with the clutch surface 29' the two housing sections turn together and shaft 18 will be rotated in a forward direction at direct drive, or high gear.

Rotary motion is transmitted from shaft 18 to the transmission shaft 45 by a planetary gearing 46 having a casing 47 mounted upon the transmission shaft 45. This casing is formed internally with gear teeth 48 which mesh with pinions 49 rotatably carried by a large gear 50 journaled about a sleeve 51 which is splined upon the rear portion of shaft 18 and which sleeve carries a sun gear 52 meshing with the pinions 49. The sleeve 51 is moved longitudinally along shaft 18 by a lever 53 pivoted at 54 in the casing 1 and having its forked upper end engaged in a groove 55 formed about the sleeve. When the sleeve is shifted forwardly and a side face of the gear 50 brought into engagement with the stationary brake ring 56, the gear 52 and the pinions 49 turn the casing 47 and shaft 45 in a reversed direction at slow speed. This is the reversing position. When gear 50 is shifted rearwardly, its gear teeth 50' mesh with internal gear 48 and lock the unit for transmitting rotary motion.

In order to shift the movable elements there has been provided hydraulic mechanism including a rotary pump 57 having a drive shaft 58 which is rotatably mounted through the lower portion of the pump casing and carries a gear 59 meshing with a gear 60 surrounding shaft 10. Oil is forced from the pump through a tube 61 in which is interposed a valve 62. This valve has an operating handle 63 which projects upwardly therefrom and is operatively engaged with a governor 64 which is rotatably mounted horizontally and provided with a gear 65 meshing with the gear 60 so that during rotation of shaft 10 the governor is operated to open and close the valve in accordance with a predetermined speed at which the shaft 10 is rotating. A relief valve 66 is mounted in tube 61 in front of valve 62. A branch tube 67 leads from tube 61 to the rear end portion of a cylinder 68 in which operates a piston 69 having its rod 70 projecting forwardly from the cylinder and connected with the lower end of the lever 34, the bracket 35 for pivotally mounting said lever being carried by the cylinder. When oil is forced into the cylinder through tubes 61 and 67 the piston is forced forwardly and rocks the lever 34 in a direction to move the clutch disk 16 away from the stationary clutch disk or ring 14 and disengage the clutch, and in order to return the piston to its normal position and close the clutch, there has been provided a spring 71 coiled about the piston rod between the piston and the front end of cylinder 68. Flow of oil through tube 67 is controlled by a solenoid valve 72 which is normally closed, as shown in Figure 2, and is actuated by its solenoid 73. A small bleeder port 74 is provided at the rear end of cylinder 68 for return of oil from the cylinder to the reservoir within the case 1, and as the oil escapes slowly through this bleeder port the clutch 16 will be let in slowly. The rear end of tube 61 is connected with a valve 75 and forwardly of this valve 75 is a solenoid valve 76 having its solenoid 77 connected to solenoid 73 by a wire 78. The lever 79 of valve 75 is connected with a governor 80 which is disposed vertically and rotated from the shaft 18. Tubes 81 and 81' connect upper and lower portions of the valve 75 with front and rear ends of a cylinder 82 in which operates a piston 83 yieldably held in a normal position intermediate the length of the cylinder by front and rear springs 84 and 85 and having its rod 86 extending forwardly out of the cylinder and connected with the lower end of lever 30 so that this lever will be operated by movement of piston 83, and the gear housing 23 will be shifted forwardly into gripping engagement with the brake ring 24 and the transmission operated at low speed. A tube 87 connects the bottom of valve 76 with the tube 81 rearwardly of the cylinder 82 and a second tube 88 extends from valve 76 to the front end of a cylinder 89 in which operates a piston 90. A bleeder port 91 is provided at the front end of the cylinder. This piston is engaged by a spring 91' in the rear portion of the cylinder and its rod 92 extends forwardly from the cylinder and is connected with the lower end of lever 53 so that the lever may be tilted about its pivot 54 to shift sleeve 51 along shaft 18 and move gear 50 into and out of engagement with the brake ring 56 and internal gear 48. A tube 93 connects the valve 75 with a pressure operated switch 94 having an escape port 95 at its front side. Below this escape port is a diaphragm 96 which is depressible from its normal position shown in Figure 2 so that the contact 97 carried by and depending from the diaphragm may be moved to a closed position in which it has bridging engagement with stationary contacts 98 and 99. A wire 100 grounded at 101 is secured to contact 99 and to contact 98 is secured a wire 102 connected at 103 to a wire 104 leading from the solenoid 73 of valve 72 and having its other end connected with the contact 105 of the vacuum switch 106. This switch has a casing 107 in which is mounted a diaphragm 108 actuated by a partial vacuum created by suction through tube 109 which is connected with the manifold of the engine. The diaphragm 108 carries a contact bar 110 shifted by movement of the diaphragm into and out of position to bridge space between contact 105 and a companion contact 111 to which a ground wire 112 is attached. A reverse lever switch 113 has spaced contacts 114, 115 and 116, contact 114 being connected with the solenoid 77 of valve 76 by a wire 117, while contact 115 is connected with wire 102 by a wire 118, and contact 116 has attached to it a ground wire 119. The movable contact 120 serves to connect the stationary contacts 114, 115 and 116 when moved into bridging engagement therewith. Current is obtained from a battery 121 having attached to one side a wire 122 leading to wire 78 intermediate the length thereof, the other side of the battery being grounded by a wire 123. It will thus be seen that movement of the pistons in the cylinders is controlled by valves which are actuated by governors and by switches.

When the engine is idling fluid is pumped from pump 57 through tube 61 and the relief valve 66 into valve 62 where it is exhausted through a port 62a into the casing 1 which serves as a reservoir and with which the supply tube 57a of the pump communicates. When the engine is speeded up the speed at which shaft 10 turns increases and turns governor 64 at an increased speed and actuates valve 62 to the opposite position to cause the fluid to flow rearwardly from valve 62 and through valve 76 and into valve 75. With the governor 80, which is driven from shaft 18 turning slowly or not at all, valve 75 directs the fluid through tube 81 into the forward portions of cylinder 82. This causes piston 83 to be shifted rearwardly and the lever 30 shifts the gear housing 23 forwardly to a low gear position. Simultaneously with this movement exhaust flow of fluid from cylinder 82 passes through tube 81' into valve 75 and through tube 93 into the pressure operated switch 94. The built up pressure above the diaphragm 96 moves contact 97 into engagement with the spaced contacts 98 and 99 and closes a circuit from the battery 121 through the ground connections and the bridged contacts of the switch and the wires 102 and 104 to the solenoid 73 of valve 72 and back to the battery through wires 78 and 122.

Referring to Figure 1 it will be seen that actuation of valve 72 to open the same will allow fluid under pressure to flow through tube 67 from pump 57 into the rear portions of cylinder 68 and its piston 69 will be shifted forwardly to rock the lever 34 and move the clutch disk 16 rearwardly away from clutch disk 14 and thereby disengage clutch 13. Therefore while the piston of cylinder 82 is moving rearwardly pressure admitted into switch 94 will cause valve 72 to open, which will admit fluid into cylinder 68 to shift its piston forwardly and effect disengagement of the clutch 13 where it remains as long as piston 83 is moving. When this piston 83 reaches the end of its stroke and ceases its rearward movement the fluid under pressure will leak through the bleed port 95 of the switch 94 and pressure reduced so that the switch will return to its normally opened position. When the switch opens, valve 72 will return to its normally closed position and the piston 67 of cylinder 68 will return by spring pressure within the cylinder as fluid is allowed to escape through the bleeder port 74 of the cylinder 68. Therefore the clutch will be let in slowly.

As rotation of the shaft 18 increases the governor 80 actuates valve 75 and causes fluid to enter the rear end of the cylinder 82 through pipe 81' and the piston 83 is moved forwardly. During forward movement of the piston the lever 30 is tilted in a direction to shift the gear housing 23 rearwardly into frictional gripping engagement with the housing section 22 and cause direct drive from shaft 10 to shaft 18. Fluid forced from the front end of cylinder 82 passes through tube 81' into the upper portion of valve 75 and through tube 93 into switch 94 and depresses the diaphragm to close the switch and effect opening of the clutch 13 to return to its operative position after the shifting is completed.

It is desirable to shift the transmission into fluid drive when a car is pulling hard, such as passing another vehicle or going up a steep hill. This is accomplished by means of the vacuum switch 106 which is operated from the vacuum in the manifold. When the accelerator of the engine is depressed excessively and opens the butterfly valve to admit air, the vacuum is relieved and the switch 106 closed by movement of the contact 110 into engagement with contacts 105 and 111. The circuit through the solenoid 73 of valve 72 is thus closed and the valve opened and the clutch 13 is disengaged and held open until the vacuum is again built up sufficiently to open the vacuum switch 106. Fluid pressure will then bleed from cylinder 68 and cause the clutch to close.

When it is desired to reverse the vehicle the reverse lever is moved and actuates the switch 113 shown in Figure 2. This switch has the three contacts 114, 115 and 116 and actuates the valve 72 as well as the valve 76. When valve 72 is actuated and moved to the position indicated by dotted lines in Fig. 2 fluid under pressure entering the valve through tube 61 flows through the tubes 88 and 87 leading respectively to the reversing cylinder 89 and the tube 81. The piston of cylinder 89 is thus moved to rock lever 53 and move sleeve 51 to a reversing position as the piston 83 in cylinder 82 is moved in a direction to effect a low gear ratio. In order to prevent the gear housing 23 from moving to high or direct drive by the position of valve 76 fluid is prevented from entering valve 75 and thus cannot actuate the piston of cylinder 82 in a forwardly moving direction. The switch 113 also actuates valve 72 to maintain the transmission in fluid connection at all times when in reverse. When shifted from reverse, valve 76 returns to its normal position and directs fluid into valve 75 and the spring 91' in cylinder 89 forces the piston 90 forwardly as fluid escapes from the front end of the cylinder through the bleed port 91. Since the apertures of the bleed ports are very small and the fluid is delivered in large quantities, the various mechanisms will be operated until the supply is shut off and the fluid escapes through the bleed ports and the mechanisms return to their normal positions.

A second oil pump 124 which is driven from shaft 18 by the same gear which drives the governor 80 discharges into the extension 61' of tube 61, thus enabling the transmission to be operated when it is necessary to push the motor vehicle in order to start it.

Having thus described the invention, what I claim is:

1. A variable speed power transmission comprising a main shaft, and a drive shaft; a clutch having its front section turning with the drive shaft and its rear section turning with the main shaft and having one of its elements longitudinally shiftable into and out of an operative position in gripping engagement with the front section, a fluid power transmission uniting said drive and main shaft when the clutch is disengaged; an auxiliary shaft, an epicyclic train of gearing operably connecting the main shaft and the auxiliary shaft and including a gear housing having a forward housing section and keyed to be slidable along said main shaft; the rear housing section being adapted to turn said auxiliary shaft; said forward and rear sections each being provided with an internal ring gear; a disk carried by and turning with the rear end of the main shaft within the gear housing; ganged pinions rotatably carried by said disk and disposed at opposite sides thereof and meshing with said ring gears; the pinions meshing with one ring gear being smaller than the pinions meshing with the other ring gear; a stationary brake ring surrounding the forward section of the gear housing; said forward section having gripping engagement with the brake ring when shifted forwardly by means of said sleeve, and having gripping engagement with the rear housing section when shifted rearwardly, and individual fluid actuated operating means associated with said clutch and said sleeve for individually moving the clutch sections and the gear housing to adjusted positions.

2. A variable speed power transmission comprising a main shaft; an auxiliary shaft; an epicyclic train of gearing operably connecting the main shaft and the auxiliary shaft and including gear housing having forward and rear sections; a sleeve rotatably carrying the forward housing section and keyed to be slidable along said main shaft; the rear housing section being adapted to turn said auxiliary shaft; said forward and rear sections each being provided with an internal ring gear; a disk carried by and turning with the rear end of the main shaft within the gear housing; ganged pinions rotatably carried by said disk and disposed at opposite sides thereof and meshing with said ring gears; the pinions meshing with one ring gear being smaller than the pinions meshing with the other ring gear; a stationary brake ring surrounding the forward section of the gear housing; said forward section having gripping engagement with the brake ring when shifted forwardly by means of said sleeve, and having gripping engagement with the rear housing section when shifted rearwardly, and fluid actuated operating means associated with said sleeve and adapted to move the forward section of the gear housing to adjusted positions.

3. The invention as defined in claim 2 wherein the fluid actuated operating means comprises an operating lever adapted for moving the sleeve; a fluid operated servo-motor operably connected to said lever for forward and rearward movement; a fluid pump driven by rotation of said main shaft; a fluid conduit for carrying the fluid under pressure from said pump to said motor; a distributing valve in said conduit; a speed sensitive means for actuating said valve and driven by said auxiliary shaft, whereby said forward housing section is shifted at predetermined revolutions per minute of said auxiliary shaft.

4. The invention as defined in claim 3 wherein a second distributing valve is interposed in said conduit between the pump and first named valve and adapted to be moved into and out of a discharging position; and speed sensitive means driven by said main shaft and operably connected to said second named valve for directing fluid to said first named valve when a predetermined revolutions per minute of said main shaft is reached.

References Cited in the file of this patent

UNITED STATES PATENTS

| Number | Name | Date |
| --- | --- | --- |
| 1,413,292 | Rauscher | Apr. 18, 1922 |
| 1,689,245 | Klimek | Oct. 30, 1928 |
| 1,885,156 | Thomas | Nov. 1, 1932 |
| 2,005,167 | Roeder | June 18, 1935 |
| 2,050,550 | Yingling | Aug. 11, 1936 |
| 2,085,668 | Mueller | June 29, 1937 |
| 2,144,270 | Palmgren | Jan. 17, 1939 |
| 2,251,625 | Hale | Aug. 5, 1941 |
| 2,404,623 | Dodge | July 23, 1946 |
| 2,408,951 | Pollard | Oct. 8, 1946 |
| 2,422,155 | Wemp | June 10, 1947 |
| 2,505,171 | Churchill | Apr. 25, 1950 |
| 2,555,702 | Railton | June 5, 1951 |

FOREIGN PATENTS

| Number | Country | Date |
| --- | --- | --- |
| 71,353 | Norway | Dec. 9, 1946 |